United States Patent
Bowness

(10) Patent No.: US 9,432,339 B1
(45) Date of Patent: Aug. 30, 2016

(54) AUTOMATED TOKEN RENEWAL USING OTP-BASED AUTHENTICATION CODES

(71) Applicant: EMC Corporation, Hopkinton, MA (US)

(72) Inventor: Piers Bowness, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 171 days.

(21) Appl. No.: 14/500,135

(22) Filed: Sep. 29, 2014

(51) Int. Cl.
*H04L 29/06* (2006.01)

(52) U.S. Cl.
CPC ....... *H04L 63/0428* (2013.01); *H04L 63/0838* (2013.01)

(58) Field of Classification Search
CPC .................. H04L 63/0428; H04L 63/0838
See application file for complete search history.

(56) References Cited

U.S. PATENT DOCUMENTS

| | | | |
|---|---|---|---|
| 5,887,065 A | 3/1999 | Audebert | |
| 7,750,793 B2 | 7/2010 | Juels | |
| 7,911,346 B1 | 3/2011 | Claudatos et al. | |
| 7,920,050 B2 | 4/2011 | Juels et al. | |
| 7,945,776 B1 | 5/2011 | Atzmony et al. | |
| 8,190,906 B1 | 5/2012 | Elbeery et al. | |
| 8,327,422 B1 | 12/2012 | Friedman et al. | |
| 8,378,786 B2 | 2/2013 | Bailey et al. | |
| 8,412,928 B1 | 4/2013 | Bowness | |
| 8,566,916 B1 * | 10/2013 | Vernon | H04L 9/003 380/255 |
| 8,618,913 B1 | 12/2013 | Bailey et al. | |
| 8,627,424 B1 * | 1/2014 | O'Malley | G06F 21/335 370/254 |
| 8,640,214 B2 * | 1/2014 | Denis | G06F 21/335 713/182 |
| 8,745,710 B1 | 6/2014 | Roth et al. | |
| 8,752,146 B1 * | 6/2014 | van Dijk | H04L 63/0861 340/5.52 |
| 8,752,148 B1 | 6/2014 | Vipond et al. | |
| 8,799,641 B1 | 8/2014 | Seidenberg et al. | |
| 8,799,655 B1 | 8/2014 | Dotan et al. | |
| 8,847,761 B1 | 9/2014 | Claudatos et al. | |
| 8,856,531 B1 | 10/2014 | Robinson et al. | |
| 8,904,482 B1 | 12/2014 | Dotan et al. | |
| 8,966,599 B1 * | 2/2015 | Barrows | H04L 63/08 705/37 |
| 9,071,424 B1 | 6/2015 | Bowness et al. | |
| 2002/0078243 A1 | 6/2002 | Rich et al. | |
| 2004/0006701 A1 | 1/2004 | Kresina et al. | |
| 2005/0187873 A1 | 8/2005 | Labrou et al. | |
| 2005/0188202 A1 * | 8/2005 | Popp | H04L 9/3263 713/175 |
| 2006/0256961 A1 | 11/2006 | Brainard et al. | |
| 2007/0118891 A1 * | 5/2007 | Buer | G06F 21/34 726/8 |
| 2007/0133591 A1 * | 6/2007 | Shatford | H04L 63/0442 370/457 |

(Continued)

OTHER PUBLICATIONS

Eronen, P., et al., "Pre-Shared Key Ciphersuites for Transport Layer Security (TLS)", <http://tools.ietf.org/html/rfc4279>, 15 pages, Dec. 2005.

*Primary Examiner* — Hadi Armouche
*Assistant Examiner* — Cheng-Feng Huang
(74) *Attorney, Agent, or Firm* — BainwoodHuang

(57) ABSTRACT

One embodiment is described of a method performed by a computing device for renewing a remote token. The method includes (a) receiving an activation code from the remote token across a network, the activation code including an identification of the token, (b) verifying that the activation code was cryptographically generated with reference to a one-time passcode (OTP) generated by the identified token using an initial key assigned to the token, and (c) in response to verifying, negotiating a new key with the token, the new key to be assigned to the token for use in producing OTPs in the future. Related computer program products, systems, and apparatuses are also described.

12 Claims, 5 Drawing Sheets

(56) References Cited

U.S. PATENT DOCUMENTS

| | | |
|---|---|---|
| 2007/0147612 A1 | 6/2007 | Forrest et al. |
| 2008/0010218 A1 | 1/2008 | Zank |
| 2008/0301461 A1* | 12/2008 | Coulier ............... G06F 21/31 713/184 |
| 2009/0193511 A1* | 7/2009 | Noe ..................... G06F 21/34 726/9 |
| 2009/0235339 A1* | 9/2009 | Mennes ............... G06F 21/33 726/5 |
| 2009/0245516 A1 | 10/2009 | Ravikiran |
| 2010/0034383 A1 | 2/2010 | Turk |
| 2011/0099384 A1* | 4/2011 | Grange ................ H04L 9/0897 71/184 |
| 2012/0151566 A1 | 6/2012 | Lin et al. |
| 2012/0263220 A1 | 10/2012 | Li et al. |
| 2012/0290840 A1 | 11/2012 | Willins |
| 2013/0145148 A1* | 6/2013 | Shablygin .......... H04L 63/0853 713/155 |
| 2013/0145173 A1* | 6/2013 | Shablygin ............ G06F 21/34 713/185 |
| 2013/0251145 A1 | 9/2013 | Lowans et al. |
| 2014/0281506 A1* | 9/2014 | Redberg ............. H04L 63/067 713/159 |

* cited by examiner

AUTOMATED TOKEN RENEWAL USING OTP-BASED AUTHENTICATION CODES

BACKGROUND

Tokens are used to generate one-time passcodes (OTPs) that enable users to securely login to or authenticate to remote servers. Remote authentication servers and tokens are both configured to be able to generate time-based OTPs that are cryptographically based on the current time as well as a secret seed to which both the token and the remote server have access.

Some tokens are configured to expire after a certain amount of time unless they are renewed. In order to renew the token, the user of the token speaks to an administrator of a remote server so that the administrator can verify the user's identity. Upon such verification, the administrator will allow the token to be renewed with a new secret seed. This expiration and renewal process prevents thieves who steal tokens from being able to have unlimited access to the remote servers because the thief will generally not be able to renew a token once the token expires.

SUMMARY

Unfortunately, the above-described conventional approaches suffer from deficiencies. In particular, although there is some security provided by the manual renewal process, it is cumbersome to require every token to be renewed manually. In addition, either expiration periods must be kept long or additional administrative staff must be hired in order to process many renewals. In addition to the cost, frequent manual renewals present an inconvenience to users.

In contrast to the conventional approaches which make token renewal cumbersome and costly, improved techniques involve automating the token renewal process. Such automation may be accomplished by generating one or more OTPs using the token and using the generated OTPs to generate an activation code. The activation code may be verified by the remote server prior to permitting the token to negotiate a new seed for renewed use. This allows frequent token renewal, generally without any user or administrator involvement.

One embodiment of the improved techniques is directed to a method performed by a computing device for renewing a remote token. The method includes (a) receiving an activation code from the remote token across a network, the activation code including an identification of the token, (b) verifying that the activation code was cryptographically generated with reference to a one-time passcode (OTP) generated by the identified token using an initial key assigned to the token, and (c) in response to verifying, negotiating a new key with the token, the new key to be assigned to the token for use in producing OTPs in the future.

Another embodiment is directed to a computer program product comprising a non-transitory computer-readable storage medium that stores a set of instructions, which, when executed by a computing device, causes the computing device to renew a token operating thereon by (1) cryptographically generating an activation code with reference to a one-time passcode (OTP) generated by the token using an initial key assigned to the token, (2) sending the generated activation code to a remote key negotiation service across a network, the generated activation code including an identification of the token, (3) in response to the activation code being verified by the key negotiation service, negotiating a new key with the key negotiation service, and (4) in response to negotiating the new key, assigning the new key to the token operating on the computing device for use in producing OTPs in the future.

Other embodiments are directed to a system, a computerized apparatus, and a computer program product for use in conjunction with the method and computer program product described above.

These embodiments are particularly advantageous because they allow token renewals to be performed frequently, which can allow fraudulent use to be detected quickly.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to automated token renewal techniques. Such automation is accomplished by generating one or more OTPs using the token and using the generated OTPs to generate an activation code. The activation code may be verified by the remote server prior to permitting the token to negotiate a new seed for renewed use. This allows frequent token renewal, generally without any user or administrator involvement.

Figure 1:
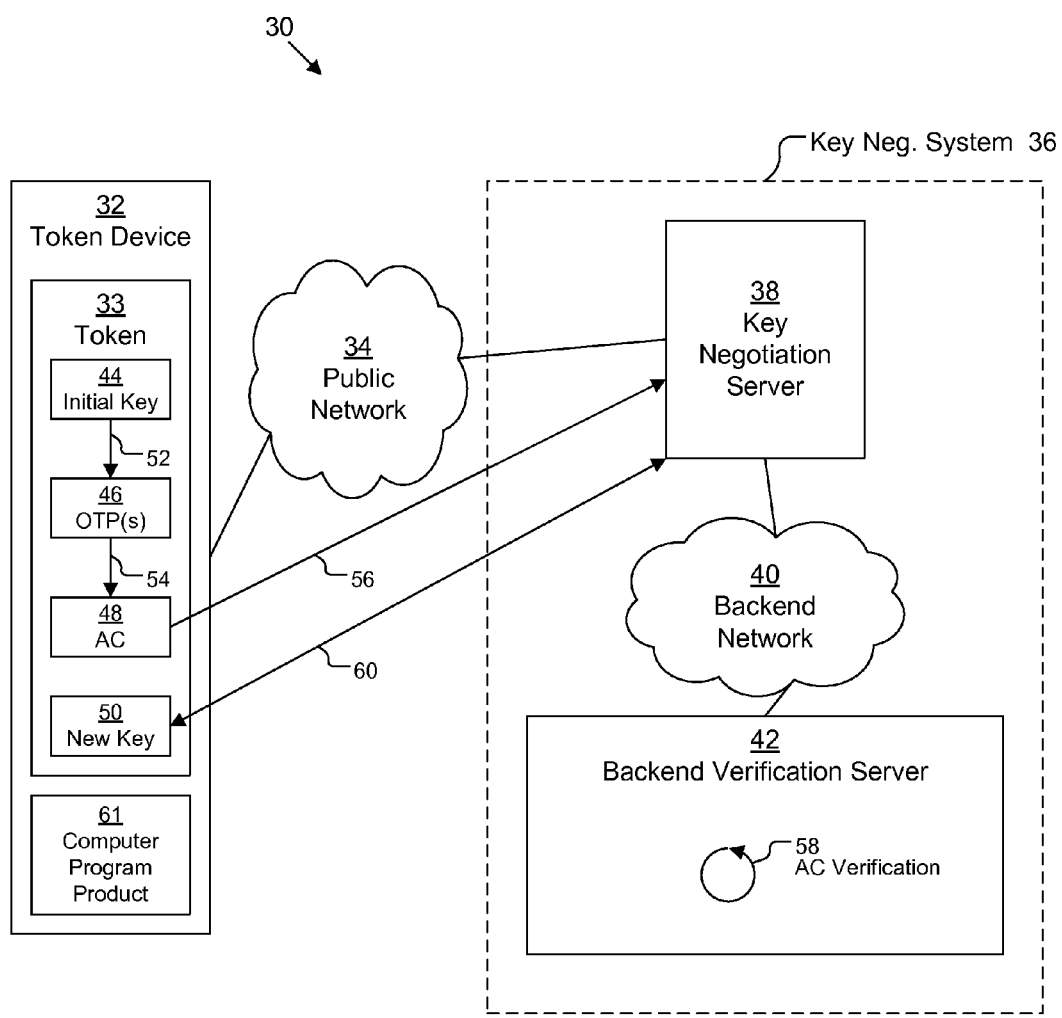
FIG. 1 depicts an example environment for renewing a token according to various embodiments.

FIG. 1 depicts an example environment 30 for renewing a token according to various embodiments. Environment 30 includes a token device 32, which includes a token 33. Token device 32 may be any kind of computing device configured to operate a token application 33, such as, for example, a personal computer, a workstation computer, a server computer, an enterprise server computer, a laptop computer, a tablet computer, a smart phone, etc. Typically, however, token device 30 is a portable computing device, such as a smart phone, tablet computer, or laptop computer. However, in other embodiments, token device 32 may instead be a hardware token with the functionality of token 33 embedded therein.

Environment 30 also includes a public network 34, such as, for example, the Internet, a cellular data network, or a combination thereof, although, in some embodiments, any communications network or combination of such networks may be used.

Environment 30 also includes a key negotiation system 36. In some embodiments, as depicted, key negotiation system 36 is made up of a key negotiation server 38 that connects to a backend verification server 42 via backend network 40. Backend network 40 is typically a private network, such as a local area network or a virtual private network. In some embodiments, instead of key negotiation system 36 being distributed across the backend network 40, the functionality of the key negotiation system 36 may be included within a single computing device.

Token device 32 is configured to communicate with the key negotiation system 36 via public network 34. The token 33 is initially provisioned with an initial key 44 or seed, which it is able to use to generate OTPs 46 in normal use.

In operation for token renewal, token 33 generates one or more OTPs 46 in an OTP generation step 52. This OTP generation step may include generating a single OTP 46, or it may include generating several OTPs 46 for consecutive time intervals. Upon generating the OTP(s) 46, the token 33 generates an authentication code (AC) 48 in an AC generation step 54. The AC 48 is typically generated by cryptographically hashing the OTP(s). In some embodiments, a salt value is used in this process. The AC 48 may also include other data as well.

Upon generating the AC 48, token device 32 sends the AC 48 across public network 34 to the key negotiation system 36 in an AC transmittal step 56. In embodiments in which the key negotiation system 36 is distributed across backend network 40, token device 32 may send the AC 48 to the key negotiation server 38 as part of a key negotiation request. In response to receiving the AC 48, key negotiation system 36 performs an AC verification process 58 to verify that the AC 48 was properly generated with reference to the correct initial key 44 (and also, in some embodiments, that the same AC 48 was not previously used for token renewal in order to prevent replay attacks and to recognize token cloning). In some embodiments, the AC verification process may also include checking whether the AC 48 is in a database of manually-created authentication codes; such checking is done because the initial seeding of the token 33 upon distribution is still performed using a manually-created authentication code and also because, in some embodiments, manual token renewal may still be permissible. In embodiments in which the key negotiation system 36 is distributed across backend network 40, step 58 is performed by the backend verification server 42 rather than the key negotiation server 38. In such embodiments, the key negotiation server 38 and the backend verification server 42 communicate with each other over backend network 40 so that the key negotiation server 38 can send the AC 48 (or at least a portion of the AC 48) to the backend verification server 42 and so that the backend verification server 42 can send a verification result (e.g., affirmative or negative) to the key negotiation server 38.

Upon an affirmative verification of the AC 48, key negotiation system 36 (in particular, the key negotiation server 38 in embodiments in which the key negotiation system 36 is distributed across backend network 40) performs a key negotiation 60 with the token 33 across public network 34 in order to establish a new key 50 to be stored in the token 33 and used by the token 33 for future authentication and login attempts as well as the next token renewal. The key negotiation 60 also results in the same new key 50 being generated by the key negotiation system 36, to be stored by key negotiation system 36 (in particular, within the backend verification server 42 in embodiments in which the key negotiation system 36 is distributed across backend network 40) in connection with an identification of the token 33 for use in future authentication attempts, login attempts, and token renewals.

In embodiments in which the token 33 is a software token, token device 32 stores a computer program product 61, which is a non-transitory computer-readable storage medium (e.g., memory and/or persistent storage, such as, for example, a hard disk, a floppy diskette, an optical disk, another kind of electromagnetic disk, tape, etc.) that stores a set of instructions, which, when executed by the token device, causes the token device to renew the token 33 operating thereon by performing a method as described above.

Figure 2:
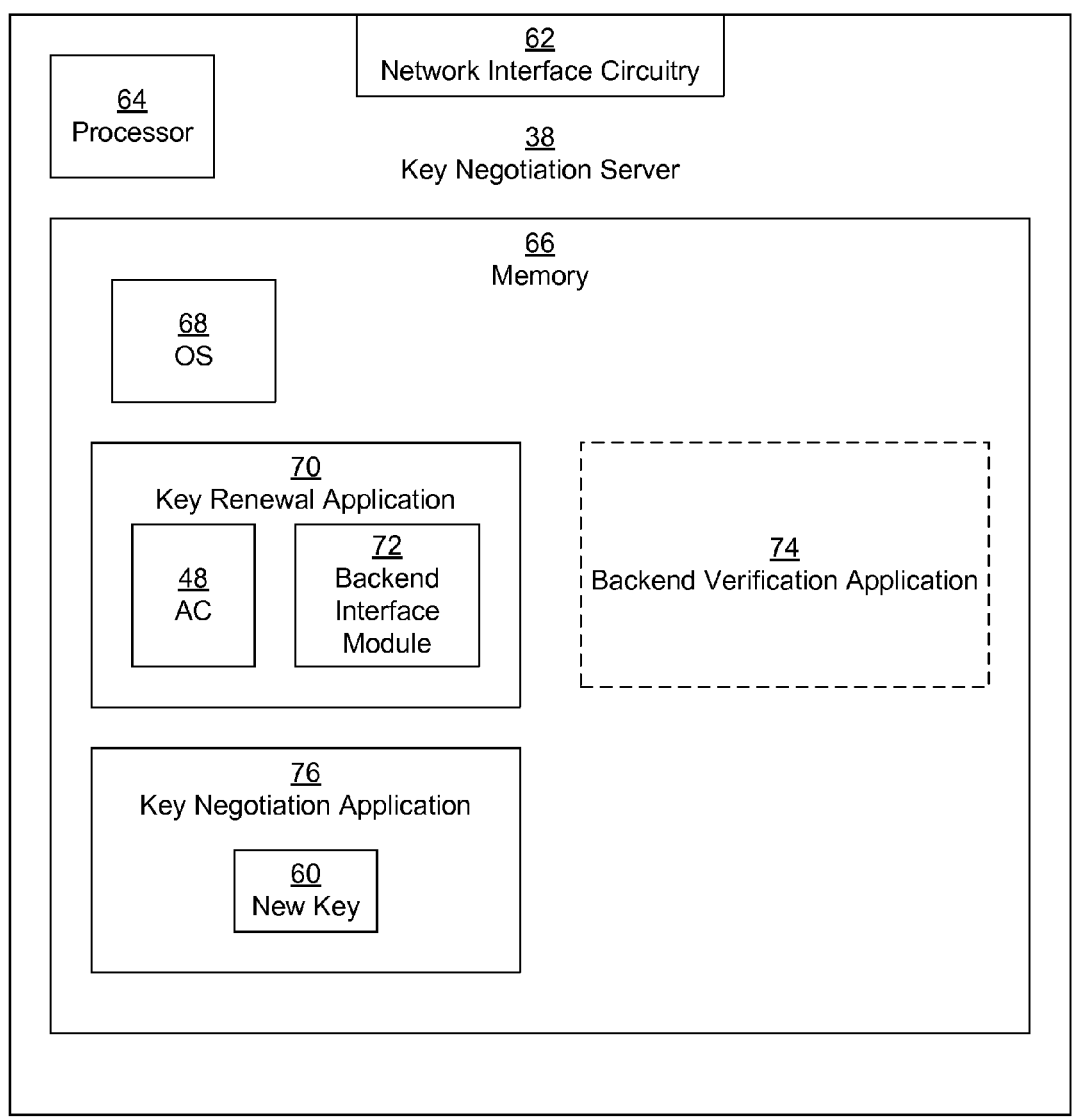
FIG. 2 depicts an example apparatus for use in conjunction with various embodiments.

FIG. 2 depicts an example key negotiation server 38 in further detail. Key negotiation server 38 includes network interface circuitry 62, processing circuitry 64, and memory 66.

Network interface circuitry 62 may include one or more Ethernet cards, cellular modems, Wireless Fidelity (WiFi) wireless networking adapters, any other devices for connecting to a network (e.g., public network 34, backend network 40, etc.), or some combination thereof. Processor 64 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 66 may be any kind of digital system memory, such as, for example, random access memory (RAM). Memory 66 stores an operating system (OS) 68 (e.g., Linux, UNIX, Windows, or a similar operating system) and one or more applications (e.g., key renewal application 70, key negotiation application 76, and backend verification application 74) executing on processor 64 as well as data (not depicted) used by those applications.

Key renewal application 70 operates on key negotiation server 38 to receive key renewal requests, including an AC transmittal 56 from token device 32 with the AC 48, which it may then store locally. Key renewal application 70 then communicates, using backend interface module 72, with either backend verification application 74 or (in embodiments in which the key negotiation system 36 is distributed across backend network 40) the backend verification server 42 so that the backend verification application 74 or backend verification server 42 can provide the AC verification result back to the key renewal application 70 again via the backend interface module 72. If the AC verification result is affirmative, then the key renewal application calls the key negotiation application 76 (which in some embodiments, may be a module of the key renewal application 70 rather than a separate application) in order to perform the key negotiation 60 with the token 33 to generate new key 50. This new key 50 may then be transmitted to the backend verification application 74 or the backend verification server 42 for storage. In some embodiments, instead of the key negotiation application 76 generating and sending the new key 50 to the backend verification server 42, the key negotiation application 76 may only generate a precursor seed to be sent to the backend verification server 42 so that the new key 50 is never known by the key negotiation server 38.

Typically, code for the OS 68 and applications 70, 74, 76, is also stored within some form of persistent storage, either on a dedicated persistent boot drive or within the other persistent storage, so that these components can be loaded into system memory 66 upon startup. An application or module 70, 72, 74, 76 when stored in non-transient form either in system memory 66 or in persistent storage, forms a computer program product. The processor 64 running one or more of these applications or modules 70, 72, 74, 76 thus forms a specialized circuit constructed and arranged to carry out various processes described herein.

Figure 3:
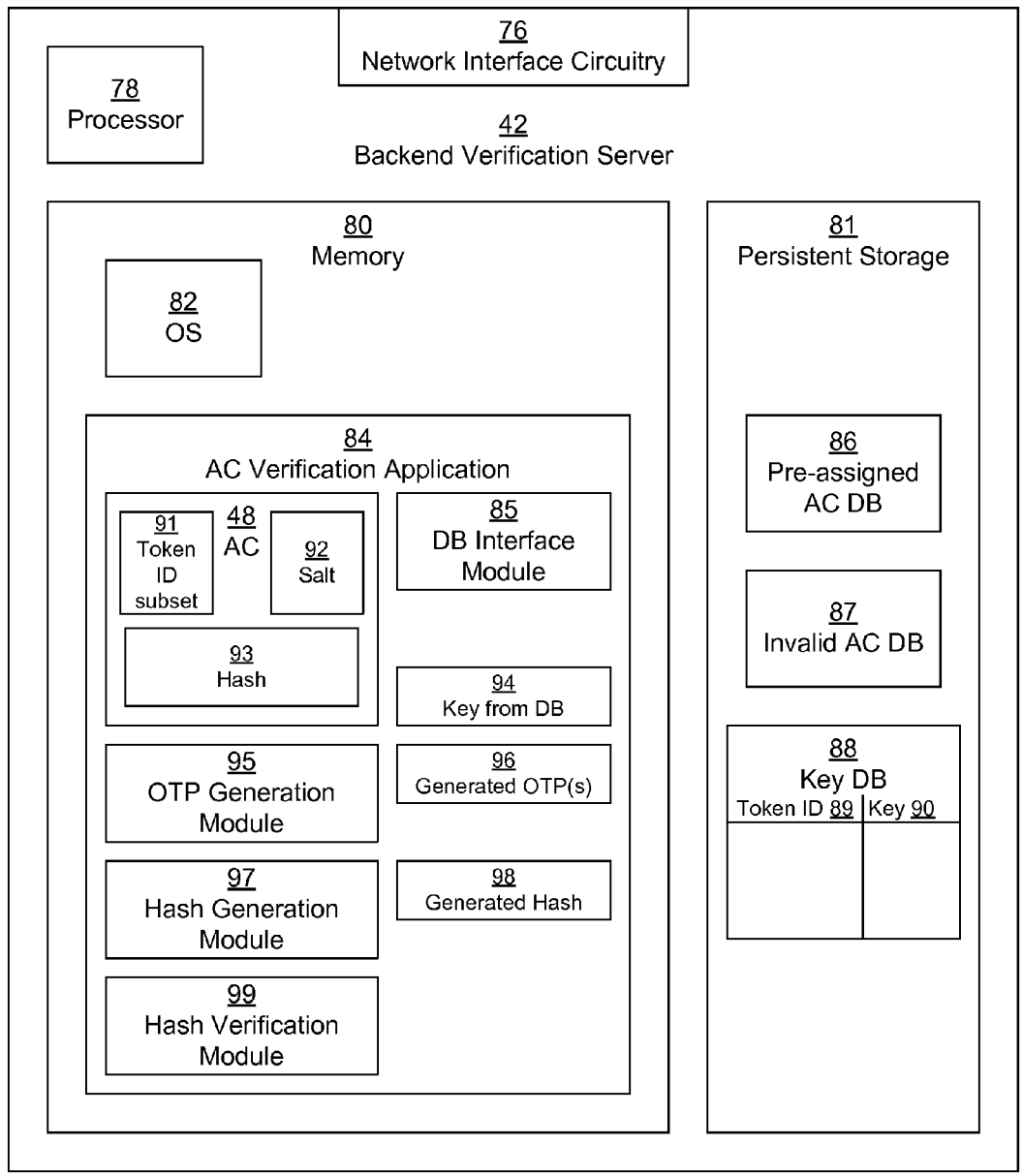
FIG. 3 depicts another example apparatus for use in conjunction with various embodiments.

FIG. 3 depicts an example backend verification server 42 in further detail. Backend verification server 42 includes network interface circuitry 76, processing circuitry 78, memory 80, and persistent storage 81.

Network interface circuitry 76 may include one or more Ethernet cards, cellular modems, WiFi wireless networking adapters, any other devices for connecting to a network (e.g., backend network 40), or some combination thereof. Processor 78 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 80 may be any kind of digital system memory, such as, for example, RAM. Memory 80 stores an OS 82 (e.g., Linux, UNIX, Windows, or a similar operating system) and one or more applications (e.g., AC verification application 84) executing on processor 78 as well as data (not depicted) used by those applications.

Persistent storage 81 may be made up of a set of persistent storage devices, such as, for example, hard disk drives, solid-state storage devices, flash drives, etc.

AC verification application 84 operates on backend verification server 42 to verify the AC 48 forwarded by the key renewal application 70. In some embodiments, instead of receiving the entire AC 48 (which may include at least a partial token identifier 91, a salt 92, and a hash 93), the AC verification application 84 may only receive one or more of the various components 91, 92, 93 in separate form. AC verification application may include a database (DB) interface module 85 for reading from and writing to DBs 86, 87, 88 stored on persistent storage 81.

In operation, AC verification application, upon receiving the AC 48, may send the AC 48 to the DB interface module 85 so that it may check for the presence of the AC 48 within a pre-assigned AC DB 86. The pre-assigned AC DB 86 stores a list of manually-created authentication codes that were assigned by administrators to particular tokens 33 either for initial seeding or for manual renewal. If the pre-assigned AC DB 86 stores the received AC 48 in connection with the appropriate token 33, then the AC verification application 84 may remove the AC 48 from the pre-assigned AC DB 86 and return an affirmative result for the verification.

If the pre-assigned AC DB 86 does not store the received AC 48 in connection with the appropriate token 33, then the AC verification application 84 may proceed to send the AC 48 to the DB interface module 85 so that it may check for the presence of the AC 48 within an invalid AC DB 87, which stores a list of previously-used authentication codes (at least for as long as the previously-used authentication codes are based on recent enough OTPs). If the AC 48 is on the list of previously-used authentication codes, then it is likely that the token 33 has been cloned, so either the previous or the current renewal attempt has been made by a fraudulent token. Alternatively, a repetition may be due to a fraudulent replay attack. In either event, an administrator may be informed, and the legitimate user may be contacted.

If the AC 48 is not found on the list of previously-used authentication codes, then the AC verification application 84 may proceed to obtain the key 90 for the token 33 having a particular token identifier (ID) 89 from the key DB 88 on persistent storage 81 via the DB interface module 85. In some embodiments, the AC verification application 84 may not be aware of the full identity of the token 33; rather the AC verification application 84 may only know a subset 91 of the token ID of the token. In such embodiments, the key DB 88 may return a list of keys 90 for all tokens containing that ID subset 91 (which may be at an identified position of the token ID, such as, for example, the last 10 digits of a 15 digit number) as part of their token IDs 89 In some embodiments, the key DB 88 also stores an expiration date for each token ID 89, and the key DB 88 only returns keys 90 for tokens containing that ID subset 91 which have an expiration date coming up within a pre-defined period (e.g., within the next 30 minutes, 30 days, etc., depending on the standard expiration period).

Once the key(s) 90 are returned, they are stored as key(s) 94 within the AC verification application 84, and the OTP generation module 95 of the AC verification application 84 is then able to use the key(s) 94 to generate one or more (depending on whether the embodiment uses a single OTP or several OTPs to generate the AC 48) OTPs 96 for each key 94. The hash generation module 97 of the AC verification application 84 is then able to use the generated OTPs 96 for each key 94 to produce a test hash 98 for each key 94. Hash verification module 99 of the AC verification application 84 is then able to compare each of the generated hashes 98 to the received hash 93, and if there is a match, then the AC verification application 84 returns a an affirmative result. Otherwise, the AC verification application 84 returns a negative result.

Typically, code for the OS 82 and applications 84 is also stored within persistent storage 81, either on a dedicated persistent boot drive or within the other persistent storage, so that these components can be loaded into system memory 80 upon startup. An application or module 84, 85, 95, 97, 99 when stored in non-transient form either in system memory 80 or in persistent storage 81, forms a computer program product. The processor 78 running one or more of these applications or modules 84, 85, 95, 97, 99 thus forms a specialized circuit constructed and arranged to carry out various processes described herein.

In embodiments in which backend verification application 74 runs on the key negotiation server 38 (i.e., when there is no separate backend verification server 42), backend verification application 74 is similar to the AC verification application 84 described in conjunction with FIG. 3. In such embodiments, key negotiation server 38 also has persistent storage that stores the various DBs 86, 87, 88 depicted in FIG. 3.

Figure 4:
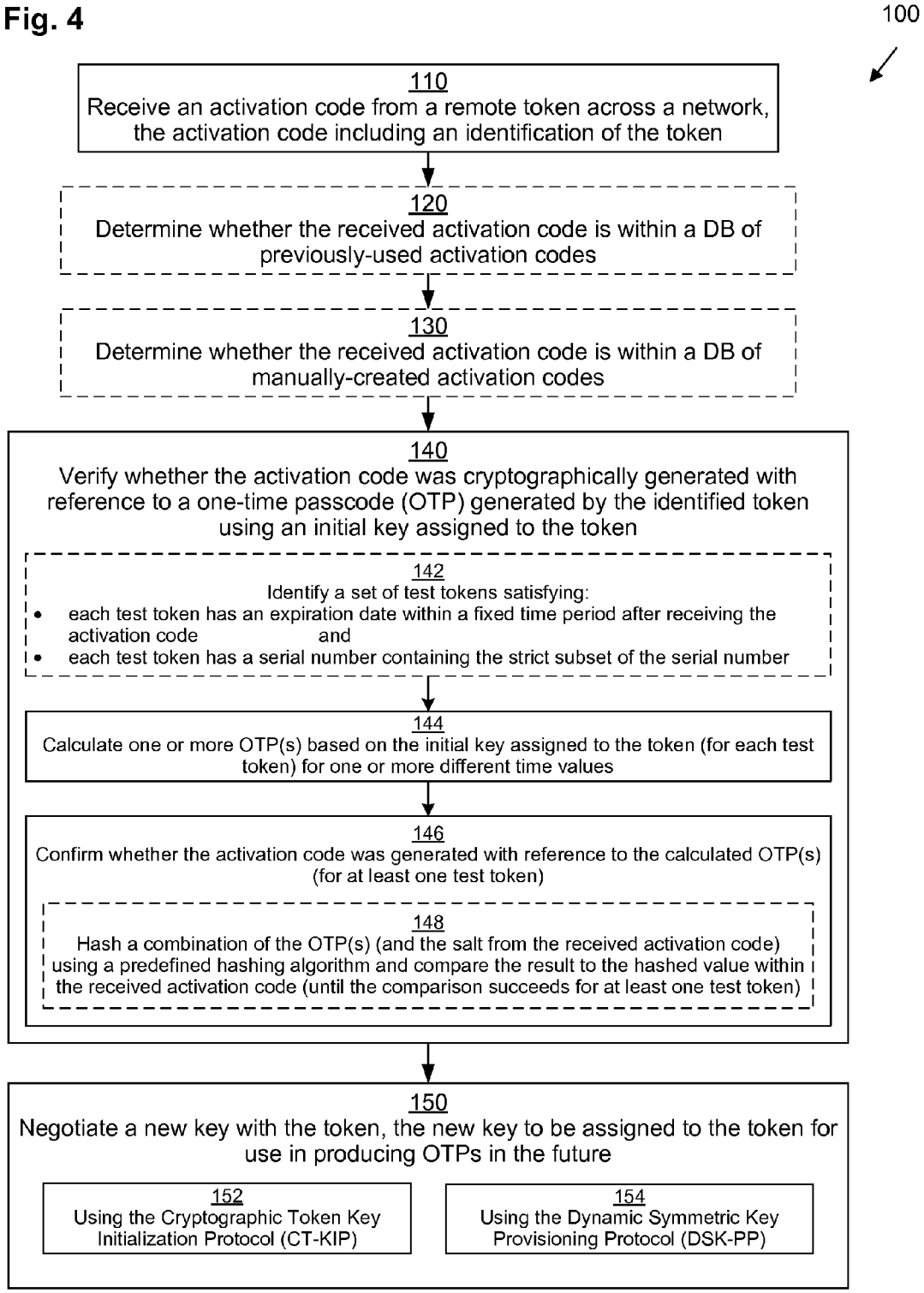
FIG. 4 depicts an example method according to various embodiments.

FIG. 4 illustrates an example method 100 according to various embodiments for renewing a token 33 by a key negotiation system 36. It should be understood that any time a piece of software, such as, for example, key renewal application 70, key negotiation application 76, backend verification application 74, or AC verification application 84 (or any of their respective component modules 72, 85, 95, 97, 99), is described as performing a method, process, step, or function, in actuality what is meant is that a computing device (e.g., token device 32, key negotiation server 38, backend verification server 42) on which that piece of software 70, 72, 74, 76, 84, 85, 95, 97, 99 is running performs the method, process, step, or function when executing that piece of software on its processor (e.g., processor 64, processor 78).

It should be understood that, within FIG. 4, steps 120 and 130 and sub-steps 142 and 148 are dashed because they may be considered ancillary or optional to method 100. In step 110, key renewal application 70 receives an AC 48 from a remote token 33 across a network 34, the AC 48 including an identification of the token 33 (e.g., token ID subset 91 or the entire token ID of the token 33).

At this point, key renewal application communicates, via backend interface module 72, all or part of the AC 48 to either the local backend verification application 74 or the AC verification application 84 running on the backend verification server 42.

In ancillary step 120, AC verification application 84 (or backend verification application 74, hereinafter omitted for clarity) determines whether the received AC 48 is stored within a DB of previously-used activation codes (e.g., invalid AC DB 87), and if so, returns a negative result, as discussed above. In ancillary step 130, AC verification application 84 determines whether the received AC 48 is stored within a DB of manually-created activation codes (e.g., pre-assigned AC DB 86), and if so, returns an affirmative result, as discussed above. It should be understood, that in some embodiments, step 120 is performed prior to step 130, while in other embodiments, step 130 is performed prior to step 120.

In step 140, AC verification application 84 verifies whether the AC 48 was cryptographically generated with reference to an OTP 46 generated by the identified token 33 using an initial key 44 assigned to the token 33.

In some embodiments, there is always only one identified token, for example, when the entire token ID is used within the AC 48 as the token ID subset 91.

However, in other embodiments, as depicted in optional sub-step 142, AC verification application 84 identifies a set of test tokens satisfying two conditions:
(I) each test token has an expiration date, obtained from the key DB 88, within a fixed time period after the AC 48 was received and
(II) each test token has a serial number (e.g., token identifier), obtained from the key DB 88, containing the token ID subset 91 (in the correct position).

In sub-step 144, OTP generation module 95 calculates one or more OTP(s) based on the initial key assigned to the token 33 (or for each test token, when sub-step 142 has been performed) for one or more different time values. The initial key 94 for the token 33 (or the set of test tokens) is obtained from the key DB 88 using the token ID or token ID subset 91. Thus, for example, if the AC 48 was received at 9:48 PM EST on Sep. 23, 2014, then, in embodiments in which 3 OTPs are used for the AC 48, OTP generation module 95 generates three OTPs 96 for the token with the appropriate token ID (or for each test token of the set of test tokens with token ID subsets 91 satisfying the conditions) for time values 9:46, 9:47, and 9:48 PM on Sep. 23, 2014.

In sub-step 146, hash generation module 97 and hash verification module 99 confirm whether the AC 48 was generated with reference to the calculated OTP(s) 96 (for at least one test token of the set of test tokens). This is done, in sub-step 148, by having the hash generation module 97 hash a combination of the generated OTP(s) 96 (in some embodiments combined with the salt 92 from the received AC 48) using a predefined hashing algorithm and then having the hash verification module 99 compare the generated hash(es) to the hashed value 93 within the received AC 48 (until the comparison succeeds for at least one test token of the set of test tokens). If a match is found, then the AC verification module 84 returns in the affirmative. Otherwise, it returns in the negative.

If there is an affirmative result, which the AC verification module 84 returns to the backend interface module 72, then the key renewal application 70 calls the key negotiation application 76 to perform step 150. Otherwise, the renewal request is denied.

In step 150, the key renewal application 70 negotiates a new key 50 with the token 33, the new key 50 to be assigned to the token 33 for use in producing OTPs 46 in the future. In some embodiments (sub-step 152), the key renewal application 70 performs the key negotiation 60 using the Cryptographic Token Key Initialization Protocol (CT-KIP) as defined by "Cryptographic Token Key Initialization Protocol (CT-KIP), Version 1.0 Revision 1" published by the Network Working Group as Request for Comment 4758 in November 2006, the entire contents and teaching of which are hereby incorporated herein in their entirety. In other embodiments (sub-step 154), the key renewal application 70 performs the key negotiation 60 using the Dynamic Symmetric Key Provisioning Protocol (DSK-PP) as defined by "Dynamic Symmetric Key Provisioning Protocol (DSKPP)" published by the Internet Engineering Task Force as Request for Comment 6063 in December 2010, the entire contents and teaching of which are hereby incorporated herein in their entirety.

Figure 5:
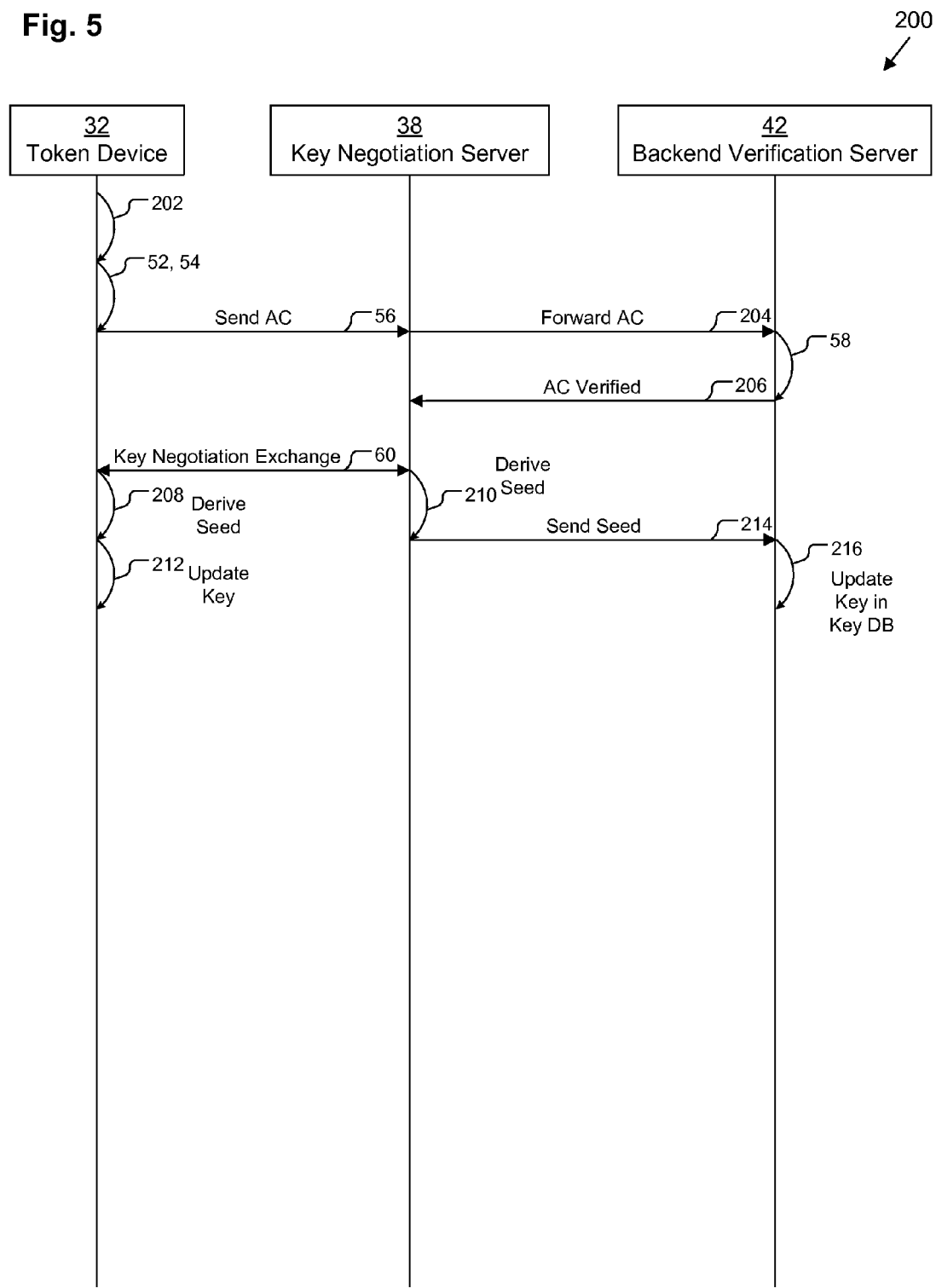
FIG. 5 depicts an example method according to various embodiments.

FIG. 5 illustrates a method 200 performed by the entire environment 30 for renewing the token 33. FIG. 5 is illustrated in the context of an embodiment in which the key negotiation server 38 is separate from the backend verification server 42.

In step 202, token device 32 experiences a re-keying event. For example, token device 32 may determine that the expiration of the token 33 is within a fixed time period (e.g., within 30 minutes for a daily-renewal token or within 30 days for a yearly-renewal token) of its expiration date. In response, token 33 generates (step 52) one or more OTPs 46 (the exact number depending on the embodiment, typically between one and five) and then generates (step 54) an AC 48. In some embodiments, AC 48 may take the form of an XML or other markup-formatted text sequence, while in other embodiments, AC 48 may take the form of a simple delimited text string (e.g., with fields delimited by dashes or commas). Typically, AC 48 includes an AC identifier, a request time, a token ID subset 91 (or, in other embodiments, a full serial number of the token 33), an identification of the hashing algorithm used, s salt value, and a hashed value, although, in some embodiments, some of these values may be omitted.

In step 56, the token 33 sends the AC 48 to the key negotiation server 38 to initiate renewal of the token 33. In response, the key negotiation server 38 forwards (step 204) the received AC 48 to the backend verification server 42, whereupon the backend verification server 42 performs a verification process (step 58, e.g., steps 120-140 from method 100) on the AC 48. If the AC 48 is verified, backend verification server 42 sends an affirmative response (step 206) back to the key negotiation server 38, which then engages in the key negotiation exchange (step 60) (e.g., using CT-KIP or DSK-PP) with the token device 32. The token device derives a new seed (step 208) and creates new key 50 for subsequent use (step 212). The key negotiation server 38 also generates the same new seed (step 210), sending (step 214) the new seed to the backend verification server 42, whereupon the backend verification server 42 generates and stores (step 216) the same new key 50 in its key DB 88 in the entry column 90 for the token 33.

In some embodiments, expiration is routinely set for 1-day periods. Thus, every day, the token 32 will attempt to renew the token 33 thereon. If the token 33 has been fraudulently cloned by a fraudster, then whichever of the real token 33 or the fraudulent token to attempt to renew first will successfully renew. If the real token 33 renews first, then the fraudulent token will be rendered inoperative, and since the new key 50 is not known to the fraudster, the fraud attempt will fail. If, on the other hand, the fraudulent token renews first, then when the real token 33 attempts to renew, the renewal will fail (because the AC 48 will have already been used), and the user will see an failure message. The user can then call up support services, and upon proving his identity, an administrator will be made aware that the fraudulent token is fraudulent. Then the administrator can invalidate the fraudulent token's key and issue a new manual activation code to the user to allow the real token 33 to be re-activated. Thus, using embodiments of the present disclosure, a short expiration period can be used in conjunction with automated token renewal order to detect and protect against fraudulent cloning of a token 33.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing system for renewing a remote token, the method comprising:
   receiving an activation code from the remote token across a network, the activation code including an identification of the remote token, the identification of the remote token within the activation code including an incomplete portion of a serial number of the remote token, the activation code serving to identify the remote token to the computing system;
   verifying that the activation code was cryptographically generated with reference to a one-time passcode (OTP) generated by the identified remote token using an initial key assigned to the remote token, wherein verifying includes:
      identifying a set of test tokens such that:
         each identified test token has an expiration date within a fixed time period after receiving the activation code; and
         each identified test token has a serial number containing the incomplete portion of the serial number;
      calculating a plurality of OTPs based on an initial key assigned to various test tokens of the set of test tokens for a plurality of different time values; and
      confirming that the activation code was generated with reference to the plurality of OTPs for the plurality of different time values for a particular test token of the set of test tokens; and
   in response to verifying, negotiating a new key with the remote token, the new key to be assigned to the remote token for use in producing OTPs in the future, wherein negotiating the new key with the remote token includes using one of the Cryptographic Token Key Initialization Protocol (CT-KIP) and the Dynamic Symmetric Key Provisioning Protocol (DSK-PP).

2. The method of claim 1 wherein the method further comprises, prior to verifying, determining that the received activation code is not within a database of manually-created activation codes.

3. The method of claim 1 wherein:
   the received activation code further includes a hashed value; and
   confirming that the activation code was generated with reference to the plurality of OTPs for the plurality of different time values for the particular test token of the set of test tokens includes hashing a combination of the plurality of OTPs for the plurality of different time values for the particular test token using a predefined hashing algorithm and comparing the result to the hashed value within the received activation code.

4. The method of claim 1 wherein:
   the received activation code further includes a salt value and a hashed value; and
   confirming that the activation code was generated with reference to the plurality of OTPs for the plurality of different time values for the particular test token of the set of test tokens includes hashing a combination of the salt value and the plurality of OTPs for the plurality of different time values for the particular test token using a predefined hashing algorithm and comparing the result to the hashed value within the received activation code.

5. The method of claim 1 wherein the method further comprises, prior to verifying, determining that the received activation code is not within a database of previously-used activation codes.

6. A system comprising:
   network interface circuitry for communicating with a remote token over a network;
   processing circuitry configured to:
      receive, via the network interface, an activation code from the remote token across the network, the activation code including an identification of the remote token, the identification of the remote token within the activation code including an incomplete portion of a serial number of the remote token, the activation code serving to identify the remote token to the system;
      verify that the activation code was cryptographically generated with reference to a one-time passcode (OTP) generated by the identified remote token using an initial key assigned to the remote token, wherein verifying includes:

identifying a set of test tokens such that:
- each identified test token has an expiration date within a fixed time period after receiving the activation code; and
- each identified test token has a serial number containing the incomplete portion of the serial number;

calculating a plurality of OTPs based on an initial key assigned to various test tokens of the set of test tokens for a plurality of different time values; and confirming that the activation code was generated with reference to the plurality of OTPs for the plurality of different time values for a particular test token of the set of test tokens; and in response to verifying, negotiate, via the network interface, a new key with the remote token, the new key to be assigned to the remote token for use in producing OTPs in the future, wherein negotiating the new key with the remote token includes using one of the Cryptographic Token Key Initialization Protocol (CT-KIP) and the Dynamic Symmetric Key Provisioning Protocol (DSK-PP).

7. The system of claim 6 wherein:
the system includes a first computing device and a second computing device separate from the first computing device;
the first computing device includes:
the network interface circuitry for communicating with the remote token over the network;
the processing circuitry configured to receive the activation code from the remote token across the network;
the processing circuitry configured to, in response to verifying, negotiate the new key with the remote token; and
processing circuitry configured to:
- send the received activation code to the second computing device for verification; and
- receive a verification result from the second computing device in response to sending the received activation code to the second computing device; and the second computing device includes the processing circuitry configured to verify that the activation code was cryptographically generated with reference to the OTP generated by the identified remote token using the initial key assigned to the remote token.

8. The system of claim 7 wherein the second computing device further includes processing circuitry configured to, prior to verifying, determine that the received activation code is not within a database of manually-created activation codes.

9. The system of claim 7 wherein the second computing device further includes processing circuitry configured to, prior to verifying, determine that the received activation code is not within a database of previously-used activation codes.

10. A computer program product comprising a non-transitory computer-readable storage medium that stores a set of instructions, which, when executed by a computing device, causes the computing device to renew a token operating thereon by:
cryptographically generating an activation code with reference to a one-time passcode (OTP) generated by the token using an initial key assigned to the token, wherein cryptographically generating the activation code includes:
- calculating a plurality of OTPs based on the initial key assigned to the token for a plurality of different time values;
- cryptographically combining the plurality of OTPs;
- placing an incomplete portion of a serial number of the token within the activation code; and
- placing the cryptographic combination of the plurality of OTPs within the activation code;

sending the generated activation code to a remote key negotiation service across a network, the activation code serving to identify the token to the remote key negotiation service;

in response to the activation code being verified by the remote key negotiation service, negotiating a new key with the remote key negotiation service, wherein negotiating the new key with the token includes using one of the Cryptographic Token Key Initialization Protocol (CT-KIP) and the Dynamic Symmetric Key Provisioning Protocol (DSK-PP); and in response to negotiating the new key, assigning the new key to the token operating on the computing device for use in producing OTPs in the future.

11. The computer program product of claim 10 wherein:
cryptographically combining the plurality of OTPs includes hashing a combination of the plurality of OTPs using a predefined hashing algorithm to yield a hashed value; and
cryptographically generating the activation code further includes placing the hashed value within the activation code.

12. The computer program product of claim 10 wherein:
cryptographically combining the plurality of OTPs includes:
- generating a salt value; and
- hashing a combination of the salt value and the plurality of OTPs using a predefined hashing algorithm to yield a hashed value; and cryptographically generating the activation code further includes placing the hashed value and the salt value within the activation code.

* * * * *